Sept. 30, 1941. L. A. BURROWS ET AL 2,257,104
EXTRUSION METHOD FOR ORGANIC MATERIALS
Filed Nov. 9, 1939
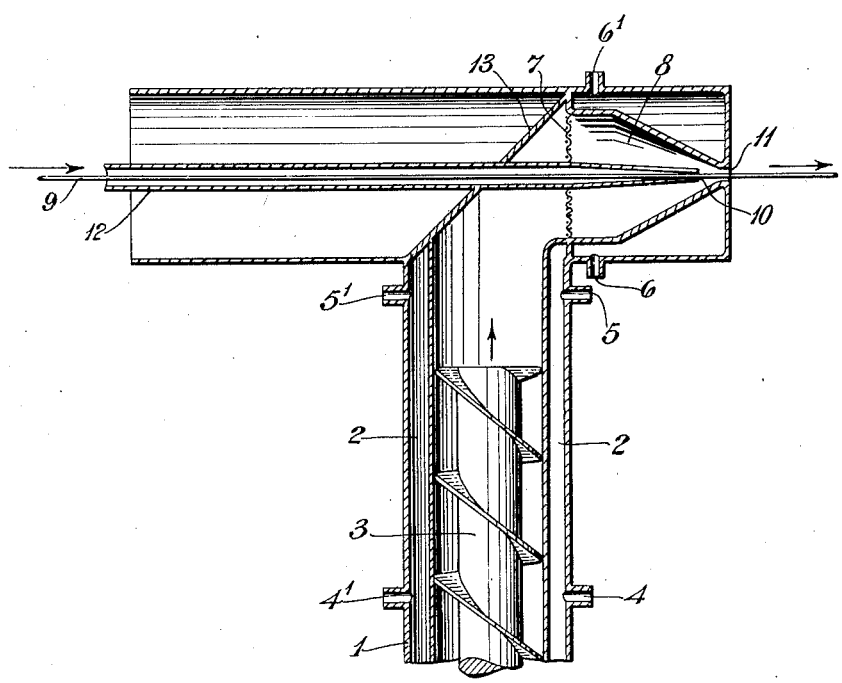
INVENTORS
LAWTON ARTHUR BURROWS,
WALTER EASTBY LAWSON AND CARL BUEL VAN WINTER
BY
ATTORNEY Patented Sept. 30, 1941

2,257,104

UNITED STATES PATENT OFFICE 2,257,104

EXTRUSION METHOD FOR ORGANIC MATERIALS

Lawton Arthur Burrows and Walter Eastby Lawson, Woodbury, and Carl Buel Van Winter, Wenonah, N. J., assignors to E. I. du Pont de Nemours & Company, Wilmington, Del., a corporation of Delaware Application November 9, 1939, Serial No. 303,568

19 Claims. (Cl. 18—59)

This invention relates to a novel method of extruding thermoplastic cellulose derivatives in predetermined form, and more particularly to the extrusion of such materials as insulating coatings on wire and other objects.

This application is a continuation-in-part of co-pending application, Serial No. 238,972, filed November 5, 1938.

The thermoplastic cellulose derivatives offer an attractive means of coating wire and other metallic objects and of obtaining products of improved properties. It is possible to extrude some of these materials by methods of the prior art. The coatings formed under such procedures, however, are not at all satisfactory from the point of view of physical properties. When extruded coatings are applied as insulation on wire, for example, they are often required to function at temperatures below 0° C., though applied at relatively high temperatures. Such requirements have not been met satisfactorily by the synthetic coatings of the prior art.

The object of our invention is an improved method of extruding thermoplastic cellulose derivatives at elevated temperatures. Another object is a method for coating wire and other metallic objects by extrusion over their surfaces of a coating of a material of this group. A further object is such a method which employs extrusion conditions whereby a firm but flexible coating is obtained on the wire. A still further object is a method of extruding ethyl cellulose, as an insulating coating on wire, possessing the desired properties of high softening temperature and flexibility. Additional objects will be disclosed as the invention is described more at length hereinafter.

We have found that the foregoing objects are accomplished by passing the thermoplastic cellulose derivative rapidly through the extrusion apparatus, the final temperature being such that the material has a viscosity of less than 600 poises. Under such conditions and at the maximum temperature, the material is extruded from the apparatus. In applying the extrusion process to the coating of metallic objects, particularly wire, the latter is preferably caused to pass through the apparatus at that portion where the material is at the highest temperature. The thermoplastic material is therefore extruded from the apparatus in the form of a concentric coating on the wire, and is quickly cooled after extrusion.

Our invention, therefore, comprises a high temperature extrusion process which is preferably characterized by rapid passage of the coating material through the extrusion apparatus. Elevated temperatures are necessary because the materials in question give extruded products of satisfactory properties only at such temperatures. On the other hand, maintenance of such materials at the elevated temperatures in question, for any considerable period of time, brings about decomposition. Hence, as a normal precaution, rapid passage through the apparatus is preferred. Low heat transfer characteristics of these thermoplastic materials make it desirable that the material be preheated before introduction into the extrusion apparatus, and that it be in comminuted form. Because of the high temperatures employed and liability to decomposition of the material, it is preferable also that the temperature of the plastic material be at its lowest point in that portion of the apparatus where the material enters, and that the temperature of said material be progressively higher as it flows through the apparatus toward the point of exit.

A preferred material for use in coating and insulating wire according to our invention is ethyl cellulose, though various other thermoplastic cellulose derivatives are likewise satisfactory. A specific embodiment of our invention, with the use of an ethyl cellulose composition, is shown with reference to the drawing, which is a plan view of one form of extrusion apparatus. The ethyl cellulose in the form of granular material is fed into the end of cylinder 1, furthest removed from the point of exit of the extruded material. The introduction of the material may desirably be by means of a funnel (not shown in the drawing). The cylinder 1 is heated by means of a surrounding jacket 2 filled with a heating medium such as oil, diphenyl, or like material of high boiling point. This heating medium is introduced into the cylinder at 4, at a temperature above 200° C., for example 240° C. The outlet for the heating medium is shown at 4'. The ethyl cellulose is preferably preheated before introduction into the cylinder, for example to 100° C., and after introduction is advanced rapidly by the screw conveyer 3 toward the wall 13, where it is deflected in a substantially perpendicular direction, and is caused to pass through screen 7, whereby any coarse impurities present are removed. The wire 9, to be insulated with the ethyl cellulose, moves rapidly in the direction shown by the arrow, for example at a speed of 800 ft. per minute. The wire passes through the guider 12, which holds it in a predetermined position. This wire is drawn through the apparatus in such manner that it is continually under tension. The ethyl cellulose in plastic form fills the space 8 and covers the wire leaving the guider at 10. The wire emerging from the apparatus at 11 is coated with a concentric covering of the desired thickness of ethyl cellulose. The coated wire is rapidly cooled after it leaves the apparatus, by means not shown, for example by successive air and water baths. The temperature of the ethyl cellulose is maintained at progressively increasing values as it passes through the apparatus, by the introduction of additional heating medium at 5 and 6, outlets 5' and 6' being provided for said heating medium. Proper valve control allows the passage of the required amount of heating medium for attaining the desired temperature in the ethyl cellulose.

Operating in the manner described, a coated and insulated wire of highly attractive properties is obtained, the coating being of such nature that the cooled product is firm but flexible and does not crack under severe testing conditions, even at extremely low temperature. The coating possesses satisfactory properties also with regard to electrical properties, as well as from other points of view.

In the foregoing description, it has been stated that an ethyl cellulose composition was employed. Desirably the ethyl cellulose will have an ethoxy content between 44 and 49.5%, while the preferred content will be between 47 and 48.5%. We do not wish to be limited, however, as to the ethoxy content of the ethyl cellulose. Ethyl cellulose by itself leaves much to be desired from the point of view of working properties and properties of the finished article. Hence, it is desirable to include a sufficient amount of plasticizing agent in the composition. It will be understood, therefore, that when mention is made of ethyl cellulose composition, such composition may include also incorporated plasticizing agents, pigments, or other added materials.

While the foregoing specific embodiment employed ethyl cellulose as the material for extrusion, it should be understood that our invention is applicable to other thermoplastic cellulose derivatives. Among the thermoplastic cellulose derivatives which may desirably be extruded by our method are ethyl cellulose, benzyl cellulose, cellulose acetate, cellulose aceto-propionate, cellulose aceto-butyrate, and other such materials. Nitrocellulose, however, is not adapted for extrusion at the temperatures contemplated by our invention and we wish definitely to exclude this material from coverage.

However, no matter which of the cellulose derivatives is employed, it is desirable that the material be extruded at a temperature such that, at the moment of extrusion, the viscosity of the material will have a value of less than 600 poises. While the desirable viscosity will usually be greater than 50, and preferably between 50 and 600 poises, we do not intend to be limited at all by the lower value cited. The viscosities were determined by a method comprising extrusion of the thermoplastic material under test through a die orifice of known diameter and length, where conditions of temperature, pressure, and rate of flow were known. It should be emphasized that the materials used exhibit no structural or plastic properties at the temperatures measured but behave entirely as viscous liquids in which the rate of flow is directly proportional to the pressure. The die used in the viscosity determinations was calibrated with an oil of known viscosity, the effective radius being found to be 0.042 cm. with a length of 0.032 cm. The radius of the die orifice was calculated from Poiseuille's equation, namely:

$$r^4 = \frac{8lv\eta}{\pi p}$$

in which $r$=the radius of the die orifice, $l$ the length, $v$ the velocity of flow of the material in cc. per second, $\eta$ the viscosity in poises of the oil standard, and $p$ the pressure in dynes per square cm. With the radius known, the viscosity of the thermoplastic material under test can then be obtained by use of the same formula. Wherever viscosity is referred to in the present specification and in the claims, therefore, it should be understood that the values given are ones determined by the above method.

It is characteristic of our invention that the thermoplastic materials employed are, in general, extruded at temperatures which are above the decomposition temperature of said materials. The rapidity of extrusion of the material insures that said material will be exposed to the high temperatures for a minimum time. Ethyl cellulose, for example, will decompose after continued heating at a temperature between 170 and 190° C. The temperature suitable for extrusion of this material, according to our method, however, is between 200 and 275° C., this range lying considerably above the minimum decomposition temperature. Strangely enough, therefore, material of improved quality is obtained according to our invention by extruding at temperatures previously thought to be inoperable, namely, at temperatures above the recognized decomposition temperatures of the materials, and at temperatures measured by a viscosity of less than 600 poises. It will be noted from the examples given in the following that in every instance the material of improved quality according to the present invention is obtained by extruding at temperatures above this recognized decomposition temperature for ethyl cellulose. In similar fashion, it will be noted that for the other cellulose derivatives, the extrusion temperatures employed are higher than heretofore considered safe. For example, the art gives a decomposition temperature of 200° C. for benzyl cellulose and the same for cellulose acetate. Yet, strangely enough, improved quality is obtained by going up beyond the temperature range known to the art. It is in this temperature range that the viscosity is within the specified range. Our preferred extrusion temperatures may be stated to be at least 15° C. above the decomposition temperatures. For thermoplastic cellulose derivatives generally, therefore, the optimum qualities of product will be obtained by use of extrusion temperatures not lower than 215° C.

Under certain conditions, the use of an inert or non-oxidizing atmosphere may be desirable within the extrusion apparatus, e. g., nitrogen, carbon dioxide, and the like.

The following examples are illustrative of our invention and describe operations sufficiently to allow anyone skilled in the art to practice said invention.

EXAMPLE 1

A composition was prepared for extrusion consisting of 70% ethyl cellulose, plasticized with 25% tricresyl phosphate in a suitable mixing apparatus and containing 5% of a chlorinated diphenyl product as flammability suppressant. This mixture was granulated after plasticizing so that it was in the form of small pieces. The material was preheated to about 100° C. and was then introduced continuously into a heated funnel and propelled thence into the cylinder of the extrusion apparatus, as shown in the figure. The plastic ethyl cellulose was advanced through the extrusion chamber by a screw conveyer, and in the extrusion head surrounded the rapidly moving wire passing through said head in a direction at right angles to the path of the screw conveyer. An insulating coating of ethyl cellulose was thus formed concentrically about the wire, which was quickly cooled after emergence from the extrusion head. The temperature of the ethyl cellulose in the extrusion head was between 220 and 225° C. The diameter of wire used was approximately 0.025″ and the thickness of ethyl cellulose coating applied about 0.010″. The improved quality of coating was such that it was tough but flexible when cooled to atmospheric temperature and below, and did not crack when subjected to a relatively severe tensile and kinking test.

EXAMPLE 2

Under relatively the same conditions as those of Example 1, the same diameter wire was coated with a composition comprising 70% ethyl cellulose, 20% dibutyl tartrate, and 10% of a chlorinated diphenyl. The temperature of the ethyl cellulose in the extrusion head was between 240 and 255° C. Again a coated wire was obtained of good insulating properties and of improved flexibility and toughness at 20 and 0° C.

EXAMPLE 3

Using the same procedure and apparatus as in the foregoing, similar wire was coated with a composition consisting of 70 parts ethyl cellulose, 30 parts tricresyl phosphate, and 2% of a hydrogenated castor oil. The temperature of the ethyl cellulose in the head was betwen 250 and 255° C. Wire of improved properties was obtained.

EXAMPLE 4

Similar wire was coated with a composition consisting of 70% ethyl cellulose and 30% of phthalates of the higher aliphatic alcohols. The temperature of the ethyl cellulose composition in the extrusion head was between 250 and 255° C. The insulated wire obtained possessed desirable electrical and improved mechanical properties.

EXAMPLE 5

Wire was coated with a composition comprising 60% cellulose acetate, 20% dimethyl phthalate, and 20% diethyl phthalate. The temperature of the cellulose acetate composition was 160° C. in the fore part of the cylinder, 214° C. in the further part, and 214° C. in the extrusion head. The extruded wire coating was of improved properties.

EXAMPLE 6

Wire was coated with an insulating composition comprising 70% cellulose aceto-propionate and 30% triphenyl phosphate. The temperature of the thermoplastic composition at the extrusion head was 220° C. Improvements were obtained in the quality of the coated wire thus produced.

According to our invention, as has been stated, the temperature of the material extruded desirably increases progressively as said material passes through the apparatus. While sufficient measurements were not stated to show the progressive rise in temperature in all the examples cited, this increase is illustrated by the fact that, in one typical successful run with ethyl cellulose, the temperatures of the material in (1) the cylinder, (2) the extension of the cylinder, and (3) the extrusion head were determined respectively as 217–223° C., 237–244° C., and 239–249° C. In another run, where large quantities of wire were coated with ethyl cellulose, temperature determinations were made at the same points of 228–235° C., 244–253° C., and 255–260° C. The use of temperatures of the preferred order of magnitude given insures a product of preferred properties and an unbroken coating. At the same time, the coating is smooth and glossy in appearance.

We have stressed in the foregoing the desirability of providing for the rapid passage of the material through the high temperature zones. In this connection, it should be noted that, in our preferred temperature range for the extrusion of ethyl cellulose; namely, at temperatures above 200° C., we prefer to employ an extrusion rate above 600 feet per minute.

With respect to the decomposition of the material, it is sufficient to note that only normal precautions need be taken to make sure that no appreciable delay is encountered in passing the material through the high temperature zones. For instance, it was determined by actual experiment that when ethyl cellulose was extruded at a maximum temperature of 259° C. at such a rate that the material was exposed to the high temperature for a period of approximately 4 minutes and 15 seconds, no appreciable decomposition occurred. However, in another run when the material was extruded under similar conditions except that it was exposed to the high temperature for a period of 12 minutes, noticeable decomposition of the ethyl cellulose occurred. This information is set forth merely to illustrate that it is sufficient to take normal precautions concerning decomposition. It is important to note that our invention is not limited to any rate of extrusion or to any time limit. Instead, our invention is predicated upon the fact that, by extruding the cellulose derivatives at higher temperatures than used heretofore; namely, at temperatures measured by an extrusion viscosity of less than 600 poises, it is possible to obtain a finished product of greatly improved quality, as disclosed in the foregoing.

It should be understood that ethyl cellulose and other thermoplastic cellulosic materials can be extruded at viscosities outside the range claimed in this invention and at temperatures lower than those claimed. Under the conditions of our invention, however, a highly superior product is obtained. It excels particularly, and to an extent that could not be anticipated, in the toughness and flexibility of the finished insulating coating, after exposure to very low temperatures, while possessing sufficient toughness at higher temperatures. Severe tensile tests of kinked coated wires have shown this superiority strikingly over similar samples coated under other viscosity and temperature conditions. The use of the temperatures and viscosities disclosed not only brings about this superiority but permits also a high speed of extrusion of the ethyl cellulose without the necessity of using excessive extrusion pressures. In the two examples of temperature variation cited in the foregoing, the rates of coating of wire of 0.025" diameter amounted respectively to 800–1200 ft. per minute and 700–1300 ft. per minute.

As a further illustration of the quality obtained under the conditions of our invention, consider the following.

EXAMPLE 7

A composition consisting of 70 parts cellulose aceto-propionate, 30 parts triphenyl phosphate, and 2 parts of standard yellow dye was extruded on wire under the following conditions.

Table

| | |
|---|---|
| Head | 252° C. |
| Extension | 244 |
| Cylinder | 240 |
| Funnel | 213 |
| Plastic (in) | 75 |
| Speed | 600' |
| O. D | .0415" |
| | O. K. Broke |
| Kinking | 20  0 |

It will be apparent from this table that the plastic was extruded while the head was maintained at a temperature of 252° C. The actual temperature of the extruded plastic corresponding to this temperature of the head was approximately 240° C. The definite superiority of the material is shown by the fact that, when the extrusion coated wire was kinked, none of the insulated coverings on the wire broke in 20 trials at room temperature, while the material exhibited a smooth and glossy texture. The cellulose aceto-propionate employed in this example was that type known to the art as high viscosity material.

In the examples cited in this case, only one thermoplastic cellulose derivative has been included in any one composition. We may, however, desirably extrude a composition in which ethyl cellulose or other thermoplastic cellulose derivative is blended with a toughening agent compatible with said cellulose derivative. We may, for example, utilize blends of ethyl cellulose with polyvinyl acetals and polyvinyl ketals, as disclosed in the co-pending case, Serial No. 280,917, filed June 24, 1939, (Payne Case 3). Likewise, blends may be used of ethyl cellulose with many other compatible thermoplastic materials, for example, with a modified alkyd resin, such as a glycerol-sebacic acid resin. Wherever the term "ethyl cellulose composition" or "cellulose derivative composition" is used in the specification or claims, therefore, we intend to include not only ethyl cellulose or the cellulose derivative, but also blends of the ethyl cellulose or other cellulose derivative with the toughening agents described. In other words, we intend to include within the scope of our invention the extrusion of any composition comprising a cellulose derivative with the exception of nitrocellulose.

In the foregoing description of our invention, the coating and insulation of wire has been especially emphasized, since this is one of the highly important applications of our method. It should be understood that, where the coating of wire is claimed, it is intended to include not only the coating of bare wire, but also of wire which has been previously covered with some other material; for example, rubber, synthetic materials resembling rubber in properties, yarn, paper, and other coatings. The invention includes also the coating of other metallic and non-metallic objects, under the conditions described. It is intended to cover also the extrusion of thermoplastic cellulose derivatives in any predetermined form, whether or not employed as coating materials on various objects.

In carrying out the process of our invention we have determined that by including as much as 25% of plasticizer in the composition to be extruded, we are able to produce an insulated conductor having a satisfactory flexibility over a wide temperature range, for instance from 0° F., or below, up to 100° F. and above.

Our invention has been described at length in the foregoing. It will be understood, however, that many variations may be made with regard to details of operation and form of apparatus without departure from the spirit of the invention. We intend to be limited only by the following patent claims.

We claim:

1. A method of extruding a thermoplastic cellulose derivative composition, which comprises heating said composition above 215° C., extruding said heated material through an orifice at a speed above 800 feet per minute and cooling said extruded material.

2. A method of extruding an ethyl cellulose composition, which comprises maintaining said ethyl cellulose at a temperature above 200° C. and ejecting said heated material through an orifice at a speed above 800 feet per minute and cooling said extruded material.

3. A method of coating objects, which comprises introducing an ethyl cellulose composition in comminuted form into an extrusion apparatus maintained at least in part above the softening point of the ethyl cellulose, passing said ethyl cellulose rapidly through said apparatus, increasing progressively the temperature of the ethyl cellulose during said passage, maintaining the final temperature of the ethyl cellulose between 200 and 275° C., causing the object to be coated to pass continuously through a portion of said apparatus at a locus where the ethyl cellulose is approximately at its highest temperature, maintaining said object in a predetermined position during said passage, extruding the ethyl cellulose from the apparatus as a flexible insulation concentrically surrounding the said object, and cooling said extruded ethyl cellulose coating.

4. A method of coating wire, which comprises introducing an ethyl cellulose composition in comminuted form into an extrusion apparatus maintained at least in part above the softening point of the ethyl cellulose, passing said ethyl cellulose rapidly through said apparatus, increasing progressively the temperature of the ethyl cellulose during said passage, maintaining the final temperature of the ethyl cellulose between 200 and 275° C., causing the wire to pass continuously through a portion of said apparatus at a locus where the ethyl cellulose is approximately at its highest temperature, maintaining said wire in a predetermined position during said passage, extruding the ethyl cellulose from the apparatus as a flexible insulation concentrically surrounding the wire, and cooling said extruded ethyl cellulose coating.

5. The method of claim 4, in which the ethyl cellulose has an ethoxy content between 47 and 48.5%.

6. A method for coating and electrically insulating wire by means of a thermoplastic cellulose derivative composition, which method comprises rapidly passing said material at an elevated temperature through an extrusion apparatus, controlling the final temperature so that said material in extrudable form has a viscosity of less than 600 poises, causing the wire to pass continuously through a portion of said apparatus at a locus where the material is approximately at its highest temperature, maintaining said wire in a predetermined position during said passage, extruding said coating material from the apparatus at a temperature at least 15° above the normal decomposition temperature thereof, as a flexible insulation concentrically surrounding the wire, and cooling said extruded insulation coating.

7. The method of claim 6, in which the cellulose derivative composition comprises a cellulose acetate composition.

8. The method of claim 6, in which the cellulose derivative composition comprises a composition containing cellulose aceto-propionate.

9. The method of claim 6, in which the cellulose derivative composition comprises an ethyl cellulose composition.

10. A method for coating and electrically insulating wire by means of a thermoplastic cellulose derivative composition, which method comprises introducing the coating material in comminuted form into an extrusion apparatus maintained at least in part at a temperature above the softening temperature of said material, passing said material rapidly through said apparatus, increasing progressively the temperature of the material during said passage, controlling the final temperature so that said material in extrudable form has a viscosity of less than 600 poises, causing the wire to pass continuously through a portion of said apparatus at a locus where the material is approximately at its highest temperature, maintaining said wire in a predetermined position during said passage, extruding said thermoplastic coating material from the apparatus at a temperature at least 15° above the normal decomposition temperature thereof as a flexible insulation concentrically surrounding the wire, and cooling said extruded insulation coating.

11. A method of coating objects with a thermoplastic cellulose derivative composition, which method comprises rapidly passing said thermoplastic material at an elevated temperature through an extrusion apparatus, controlling the final temperature so that said material in extrudable form has a viscosity of less than 600 poises, causing the object to be coated to pass through a portion of said apparatus at a locus where the material is approximately at its highest temperature, extruding said material from said apparatus at a temperature at least 15° above the normal decomposition temperature thereof in the form of a flexible coating on the surface of the object, and cooling the extruded coating.

12. A method of extruding a thermoplastic cellulose derivative composition, which method comprises rapidly passing said thermoplastic material at an elevated temperature through an extrusion apparatus, controlling the final temperature so that said material in extrudable form has a viscosity of less than 600 poises, extruding said material in predetermined shape from said apparatus at a temperature at least 15° above the normal decomposition temperature thereof and cooling said extruded material.

13. A method of coating wire by means of a thermoplastic cellulose derivative composition, which method comprises introducing the coating material in comminuted form into an extrusion apparatus maintained at least in part at a temperature above the softening temperature of said material, increasing progressively the temperature of the material during said passage and exceeding the decomposition temperature of said material but passing said material through the apparatus sufficiently rapidly to avoid excessive decomposition, controlling the final temperature so that said material in extrudable form has a viscosity of less than 600 poises, causing the wire to pass continuously through a portion of said apparatus at a locus where the material is approximately at its highest temperature, maintaining said wire in a predetermined position during said passage, extruding said coating material from the apparatus at a temperature at least 15° above the normal decomposition temperature thereof as a flexible insulation concentrically surrounding the wire, and cooling said extruded insulation coating.

14. A method of extruding an ethyl cellulose composition, which method comprises passing the ethyl cellulose composition rapidly through an extrusion apparatus at an elevated temperature, extruding the ethyl cellulose in predetermined shape from said apparatus at a temperature between 200 and 275° C. and cooling said extruded material.

15. A method of coating objects with an ethyl cellulose composition, which method comprises rapidly passing the ethyl cellulose composition at an elevated temperature through an extrusion apparatus, causing the object to be coated to pass through a portion of said apparatus at a locus where the ethyl cellulose is approximately at its highest temperature, extruding said ethyl cellulose from the apparatus at a temperature between 200 and 275° C. in the form of a flexible coating on the surface of the object, and cooling the extruded coating.

16. An electrical conductor provided with an improved insulation of glossy texture, non-cracking at 0° C., comprising an extruded sheath of a thermoplastic cellulose derivative composition.

17. A method of extruding a cellulose acetate composition, which method comprises passing the cellulose acetate composition rapidly through an extrusion apparatus at an elevated temperature, extruding the cellulose acetate in predetermined shape from said apparatus at a temperature between 200° C. and 275° C. and cooling said extruded material.

18. A method of extruding a cellulose aceto-butyrate composition, which method comprises passing the cellulose aceto-butyrate composition rapidly through an extrusion apparatus at an elevated temperature, extruding the composition in predetermined shape from said apparatus at a temperature between 200° C. and 275° C. and cooling said extruded material.

19. A method of extruding a thermoplastic cellulose derivative composition, which method comprises passing said composition rapidly through an extrusion apparatus at an elevated temperature, extruding the composition in predetermined shape from said apparatus at a temperature between 215 and 275° C. and cooling said extruded material.

LAWTON ARTHUR BURROWS.
WALTER EASTBY LAWSON.
CARL BUEL VAN WINTER.